(12) United States Patent
Lee et al.

(10) Patent No.: US 11,595,346 B2
(45) Date of Patent: Feb. 28, 2023

(54) ELECTRONIC DEVICE AND METHOD FOR WIRELESS COMMUNICATIONS

(71) Applicant: Samsung Electronics Co., Ltd., Gyeonggi-do (KR)

(72) Inventors: Wookwang Lee, Gyeonggi-do (KR); Milim Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/523,031

(22) Filed: Nov. 10, 2021

(65) Prior Publication Data

US 2022/0311737 A1 Sep. 29, 2022

Related U.S. Application Data

(63) Continuation of application No. PCT/KR2021/015188, filed on Oct. 27, 2021.

(30) Foreign Application Priority Data

Mar. 29, 2021 (KR) ........................ 10-2021-0040172

(51) Int. Cl.
*G06F 3/06* (2006.01)
*G06F 12/10* (2016.01)
(Continued)

(52) U.S. Cl.
CPC ...... *H04L 61/2521* (2013.01); *H04L 61/5007* (2022.05)

(58) Field of Classification Search
CPC ........................ H04L 61/2521; H04L 61/5007
See application file for complete search history.

(56) References Cited

U.S. PATENT DOCUMENTS

2005/0122944 A1 6/2005 Kwon et al.
2010/0014459 A1 1/2010 Mir et al.
(Continued)

FOREIGN PATENT DOCUMENTS

KR 10-2005-0055118 A 6/2005
KR 10-2011-0027797 A 3/2011
(Continued)

OTHER PUBLICATIONS

International Search Report dated Jan. 27, 2022.

*Primary Examiner* — Christopher B Robinson
(74) *Attorney, Agent, or Firm* — Cha & Reiter, LLC

(57) ABSTRACT

Disclosed are an electronic device for wireless communication and a method thereof. The electronic device may include an interface module and a processor. The processor may be configured to establish a first Ethernet tethering connection with an external electronic device by using an Ethernet driver, provide an Internet service to the external electronic device using a first IP address allocated to the external electronic device, deactivate the Ethernet driver in response to identifying that the IP address of the electronic device is changed and the first Ethernet tethering connection is in the bridge mode, reactivate the deactivated Ethernet driver, establish a second Ethernet tethering connection with the external electronic device by using the reactivated Ethernet driver, and provide the Internet service to the external electronic device using a second IP address allocated to the external electronic device.

15 Claims, 13 Drawing Sheets

(51) Int. Cl.
*G06F 13/16* (2006.01)
*H04L 61/2521* (2022.01)
*H04L 61/5007* (2022.01)

(56) References Cited

U.S. PATENT DOCUMENTS

| | | | |
|---|---|---|---|
| 2013/0103860 A1* | 4/2013 | Galloway | G06F 21/6218 |
| | | | 710/13 |
| 2014/0181172 A1* | 6/2014 | Elliott | H04L 63/0281 |
| | | | 709/201 |
| 2016/0295622 A1* | 10/2016 | Huang | H04W 48/18 |
| 2018/0285017 A1* | 10/2018 | Kang | G06F 3/0683 |
| 2019/0069234 A1* | 2/2019 | Neelakandan | H04W 52/0216 |
| 2020/0235607 A1* | 7/2020 | Kanarellis | H02J 7/02 |
| 2022/0311737 A1* | 9/2022 | Lee | H04L 67/00 |

FOREIGN PATENT DOCUMENTS

| KR | 10-2013-0060072 A | 6/2013 |
|---|---|---|
| KR | 10-2015-0127390 A | 11/2015 |
| KR | 10-2020-0001593 A | 1/2020 |
| KR | 10-2223748 B1 | 2/2021 |

\* cited by examiner

ELECTRONIC DEVICE AND METHOD FOR WIRELESS COMMUNICATIONS

CROSS-REFERENCE TO RELATED APPLICATIONS

This application is a continuation of International Application No. PCT/KR2021/015188 designating the United States, filed on Oct. 27, 2021, in the Korean Intellectual Property Receiving Office and claiming priority to Korean Patent Application No. 10-2021-0040172, filed on Mar. 29, 2021, in the Korean Intellectual Property Office, the disclosures of which are incorporated by reference herein in their entireties.

TECHNICAL FIELD

Various embodiments of the instant disclosure generally relates to an electronic device for wireless communication and a method of operating the same.

BACKGROUND ART

A user may access various data networks (for example, the Internet) using various electronic devices such as, for example, smart phones, tablet computers, notebooks, laptop computers, and desktop computers. In one example, while the smart phone may provide mobile access to phone and computer processing functions to the user, the tablet computer may be carried by the user and may provide a larger screen than the smart phone. Portable notebook or laptop computer may not only provide larger screens than the smart phone but also provide built-in hardware keyboards that allow for efficient word processing. Meanwhile, desktop computer or smart TV may provide larger screens for media viewing but cannot be easily carried due to size and weight thereof.

The user can use various electronic devices according to his or her need. Some electronic devices, for example, portable notebook, laptop computer, or personal computer may provide more various improved computing environments to the user, but may not include a communication circuit (or a wireless communication module) capable to directly accessing a wireless or wired network. And even when the electronic device includes the communication circuit or the wireless communication module supporting one access technology such as wired Ethernet, Wi-Fi, or cellular communication, the user may desire to access the Internet using another access technology which is not supported by the electronic device.

A dongle is an electronic device that accesses an external electronic device (for example, a terminal device) and allows the external electronic device to access the Internet through wireless broadband network or secure network. For example, an external electronic device having no Wi-Fi communication function or cellular communication function such as 2G, 3G, Long-Term Evolution (LTE), $5^{th}$ generation (5G), or New Radio (NR) may be connected to a dongle supporting cellular communication or Wi-Fi communication through wired or wireless means, for example, Wi-Fi, Bluetooth, Ethernet, or a Universal Serial Bus (USB), and may access the Internet through the dongle. For example, the dongle supporting the Wi-Fi connection may be referred to as a Wi-Fi dongle.

With the proliferation of 5G, a 5G dongle making 5G cellular connections to USB Ethernet or Wi-Fi rather than a smart phone is being researched. The 5G dongle may have a direct cellular connection with the 5G cellular network, and may be connected to an external electronic device through USB Ethernet and may provide the cellular connection to the external electronic device through the USB Ethernet.

DETAILED DESCRIPTION

An electronic device operating as a dongle may be connected to the Internet through a public network and may use a tethering mode or a bridge mode in order to provide Internet service to an external electronic device through an Ethernet tethering connection between the electronic device and the external electronic device. When the electronic device operates in tethering mode, the external electronic device may acquire its own unique IP address distinguished from the IP address of the electronic device through the electronic device and use the Internet service using the unique IP address. When the electronic device provides the Internet service to the external electronic device in bridge mode, the external electronic device may share the IP address of the electronic device, unlike in the tethering mode.

When the electronic device switches from tethering mode to bridge mode, an IP address change for the external electronic device may be needed, but the external electronic device may not recognize the mode switch and attempt to use the Internet service continuously with the existing IP address, and thus communication failure may occur. When the electronic device switches from tethering mode to bridge mode, and when the electronic device and the external electronic device are connected with a USB Ethernet cable, the external electronic device may be required to physically release and reconnect to the external electronic device in order to acquire its new IP address, which may inconvenience the user.

In addition, when the IP address of the electronic device is changed for some other reason while the electronic device provides the Internet service to the external electronic device in bridge mode, the IP address of the external electronic device would also need to be correspondingly changed, but the external electronic device may not recognize the IP address change, and thus communication failure may occur.

SUMMARY

An electronic device according to an embodiment includes an interface module, and at least one processor connected to the interface module, wherein the at least one processor is configured to establish a first Ethernet tethering connection with an external electronic device through the interface module by using an Ethernet driver executed by the at least one processor, provide an Internet service to the external electronic device through the first Ethernet tethering connection, using a first IP address allocated to the external electronic device via the establishment of the first Ethernet tethering connection, identify a change in an IP address of the electronic device while the Internet service is provided, identify whether the first Ethernet tethering connection is in a bridge mode when the change in the IP address of the electronic device is identified, deactivate the Ethernet driver in response to identifying that the IP address of the electronic device is changed while the Internet service is provided and the first Ethernet tethering connection is in the bridge mode, reactivate the deactivated Ethernet driver after deactivating the Ethernet driver, establish a second Ethernet tethering connection with the external electronic device by using the reactivated Ethernet driver, and provide the Internet service to the external electronic device through the second Ethernet tethering connection, using a second IP address allocated to the external electronic device via the establishment of the second Ethernet tethering connection.

An electronic device according to an embodiment includes an interface module, and at least one processor connected to the interface module, wherein the at least one processor is configured to establish a first Ethernet tethering connection with an external electronic device through the interface module by using an Ethernet driver executed by the at least one processor, provide an Internet service to the external electronic device through the first Ethernet tethering connection, using a first IP address allocated to the external electronic device via the establishment of the first Ethernet tethering connection, deactivate the Ethernet driver when it is identified that a bridge mode for the external electronic device is configured through a user input while the Internet service is provided, reactivate the deactivated Ethernet driver after deactivating the Ethernet driver, establish a second Ethernet tethering connection in the bridge mode with the external electronic device by using the reactivated Ethernet driver, and provide the Internet service to the external electronic device through the second Ethernet tethering connection, using a second IP address allocated to the external electronic device via the establishment of the second Ethernet tethering connection.

A method of operating an electronic device for wireless communication according to an embodiment includes establishing a first Ethernet tethering connection with an external electronic device by using an Ethernet driver executed by a processor of the electronic device, providing an Internet service to the external electronic device through the first Ethernet tethering connection, using a first IP address allocated to the external electronic device via the establishment of the first Ethernet tethering connection, identifying a change in an IP address of the electronic device while the Internet service is provided, identifying whether the first Ethernet tethering connection is in a bridge mode when the change in the IP address of the electronic device is identified, deactivating the Ethernet driver in response to identifying that the IP address of the electronic device is changed while the Internet service is provided and the first Ethernet tethering connection is in the bridge mode, reactivating the deactivated Ethernet driver after deactivating the Ethernet driver, establishing a second Ethernet tethering connection with the external electronic device by using the reactivated Ethernet driver, and providing the Internet service to the external electronic device through the second Ethernet tethering connection, using a second IP address allocated to the external electronic device via the establishment of the second Ethernet tethering connection.

A method of operating an electronic device for wireless communication according to an embodiment includes establishing a first Ethernet tethering connection with an external electronic device by using an Ethernet driver executed by a processor of the electronic device, providing an Internet service to the external electronic device through the first Ethernet tethering connection, using a first IP address allocated to the external electronic device via the establishment of the first Ethernet tethering connection, deactivating the Ethernet driver when it is identified that a bridge mode for the external electronic device is configured via a user input while the Internet service is provided, reactivating the deactivated Ethernet driver after deactivating the Ethernet driver, establishing a second Ethernet tethering connection in the bridge mode with the external electronic device by using the reactivated Ethernet driver, and providing the Internet service to the external electronic device through the second Ethernet tethering connection, using a second IP address allocated to the external electronic device via the establishment of the second Ethernet tethering connection.

MODE FOR CARRYING OUT THE INVENTION

Figure 1:
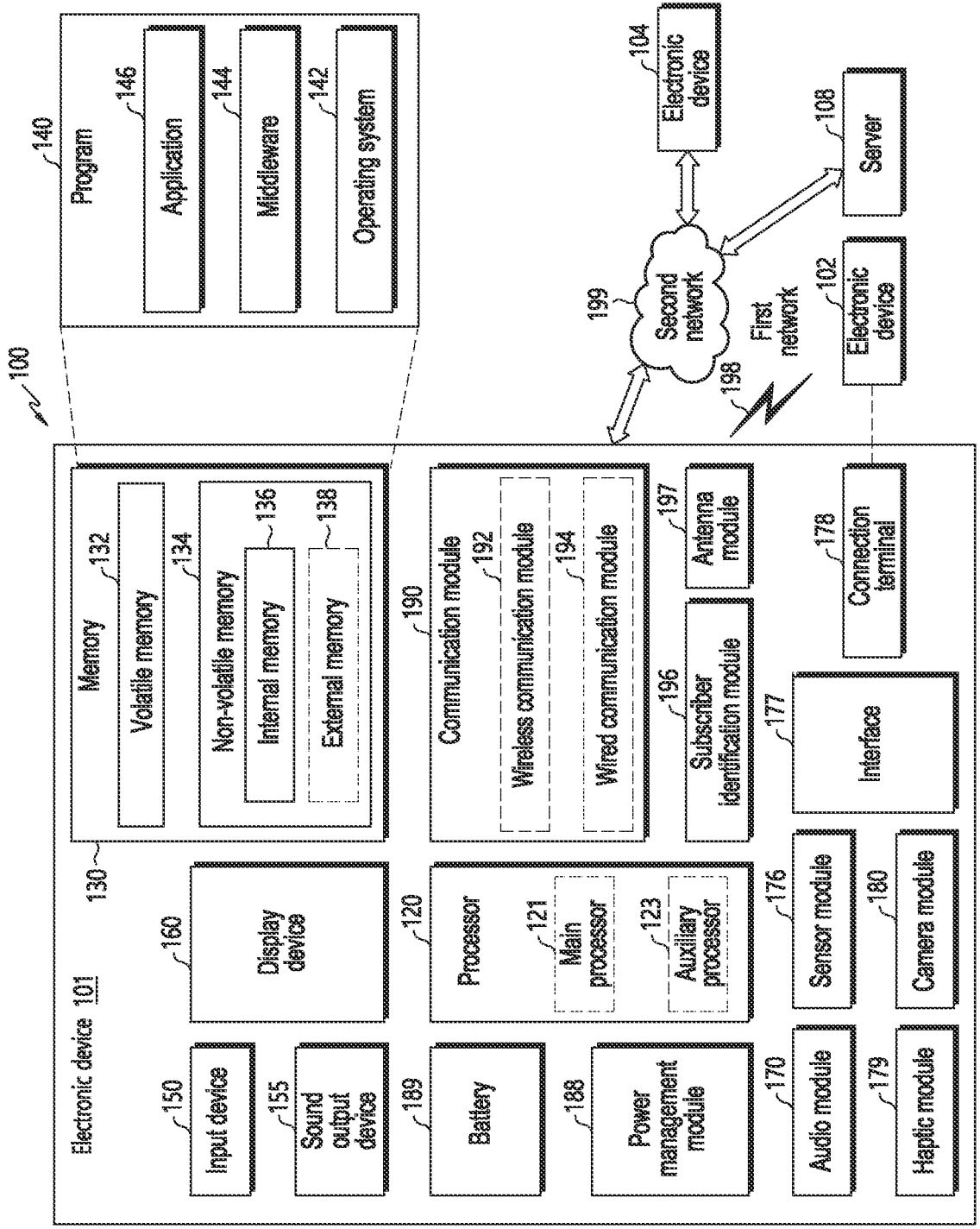
FIG. 1 is a block diagram illustrating an electronic device within a network environment according to various embodiments.

Hereinafter, various embodiments of the disclosure will be described in detail with reference to the accompanying drawings. In the following description of various embodiments of the disclosure, a detailed description of relevant known functions or configurations incorporated herein will be omitted when it is determined that the description may make the subject matter of various embodiments of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the disclosure. Alternatively, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include", or the like should not be interpreted to necessarily include all elements or all operations described in the specification, and should be interpreted to be allowed to exclude some of them or further include additional elements or operations.

Alternatively, the terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, various embodiments of the disclosure will be described in detail with reference to the accompanying drawings. Regardless of drawing signs, the same or like elements are provided with the same reference numeral, and a repeated description thereof will be omitted. Alternatively, in describing various embodiments of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

Hereinafter, various embodiments of the disclosure describe a terminal, but the terminal may also be referred to as an electronic device, a mobile station, a Mobile Equipment (ME), a User Equipment (UE), a User Terminal (UT), a Subscriber Station (SS), a wireless device, a handheld device, or an Access Terminal (AT). Alternatively, in various embodiments of the disclosure, the terminal may be a device having a communication function, such as, for example, a mobile phone, a Personal Digital Assistant (PDA), a smart phone, a wireless MODEM, or a notebook.

In a detailed description of various embodiments of the disclosure, standards provided by Institute of Electrical and Electronics Engineers (IEEE) which is a wireless access standardization organization and Wi-Fi Alliance (WFA) are referred to, but the main subject of the disclosure can be somewhat modified and applied to other communication systems having a similar technical background without departing from the scope of the disclosure, and the modifications can be made on the basis of determination of those skilled in the art.

FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
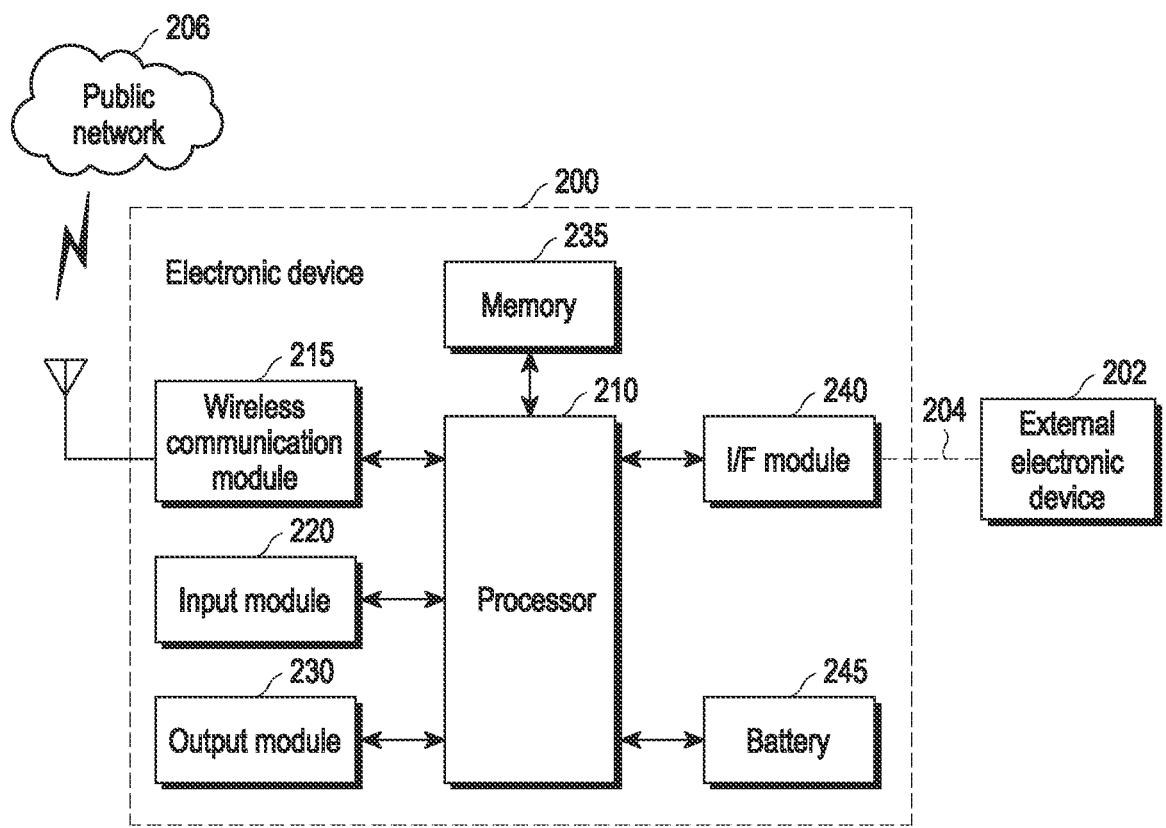
FIG. 2 is a block diagram illustrating a configuration of an electronic device 200 according to an embodiment.

FIG. 2 is a block diagram illustrating a configuration of an electronic device 200 according to an embodiment.

In an embodiment, the electronic device 200 may include elements which are the same as or similar to at least some of the elements (for examples, modules) of the electronic device 101 illustrated in FIG. 1. In an embodiment, the electronic device 200 may be the same as or similar to the electronic device 101 of FIG. 1. For example, the electronic device 200 may include at least one of the elements included in the electronic device 101 of FIG. 1. In an embodiment, the electronic device 200 may operate as a dongle providing Internet service to an external electronic device 202 through a tethering connection with the external electronic device 202.

Referring to FIG. 2, the electronic device 200 may include a processor 210 (for example, the processor 120 of FIG. 1), a wireless communication module 215 (for example, the communication module 190 of FIG. 1) connected to an antenna module (for example, the antenna module 197 of FIG. 1), an input module 220 (for example, the input module 150 of FIG. 1), an output module 230 (for example, the display module 160 and/or the sound output module 155 of FIG. 1), a memory 235 (for example, the memory 130 of FIG. 1), an interface module 240 (for example, the interface 177 of FIG. 1), and a battery 245 (for example, the battery 189 of FIG. 1).

According to certain embodiments, the wireless communication module 215 may include, for example, at least one of a cellular communication module, a Wireless Fidelity (Wi-Fi) communication module, a Bluetooth communication module, a Near Field Communication (NFC) module, and a Global Navigation Satellite System (GNSS) communication module. Certain of the various communication modules may access the Internet through a public network (for example, cellular network or Wi-Fi network). In an embodiment, the wireless communication module 215 may access a base station of a cellular network using various cellular communication schemes such as 2G, 3G, LTE, 5G, or new radio (NR) and may be connected to an Internet server through the cellular network. In another embodiment, the wireless communication module 215 may access an Access Point (AP) of a Wi-Fi network and may be connected to an Internet server through the Wi-Fi network. The wireless communication module 215 may include one or more communication processors which operate independently from the processor 210 and support direct (for example, wired) communication or wireless communication.

According to an embodiment, the input module 220 may be configured to generate various input signals which can be used for the operation of the electronic device 200. The input module 220 may include a touch pad, a touch panel, or at least one button. The touch pad may detect touch inputs by employing, for example, capacitive, resistive, infrared, or ultrasonic methods. When a capacitive touch pad is provided, physical contact or proximity recognition may be possible. The touch pad may further include a tactile layer. The tactile layer may provide tactile feedback to a user. The aforementioned at least one button may include, for example, a physical button or an optical key.

According to an embodiment, the input module 220 may generate a user input related to establishment of a connection of the electronic device 200. According to an embodiment, when the electronic device 200 provides a tethering connection to at least one external electronic device (for example, the external electronic device 202) through the interface module 240, the input module 220 may generate user inputs indicating parameters for establishing the tethering connection. The parameters may include, for example, at least one of a parameter indicating IPv4, a primary Domain Name Service (DNS), a parameter indicating a secondary DNS, a parameter indicating a Dynamic Host Configuration Protocol (DHCP), and a parameter indicating bridge mode. When the parameter indicating bridge mode is configured by a user input, the electronic device 200 may configure the tethering connection in bridge mode. When the parameter indicating the bridge mode is deactivated by a user input, the electronic device 200 may configure the tethering connection in tethering mode. That is, the tethering connection may not necessarily be in tethering mode, but also may be in bridge mode. The parameter indicating the bridge mode may be deactivated in default settings. Detailed descriptions of the tethering mode and the bridge mode will be described below with reference to FIGS. 3 and 4.

According to an embodiment, the output module 230 may display information related to the operation of the electronic device 200. In an embodiment, the output module 230 may display information related to the tethering connection between the electronic device 200 and the external electronic device 202 or information related to the establishment of the tethering connection. In an embodiment, the output module 230 may display user setting screens on which user input for establishing the tethering connection can be received. According to an embodiment, the output module 230 may include at least one light-emitter such as a Light Emitting Diode (LED). For example, the light-emitter may be controlled to emit a color corresponding to charging in progress or charging completed.

According to an embodiment, the memory 235 may store various codes, information, and/or data used by at least one element (for example, the processor 210) of the electronic device 200. The data may include, for example, software which can be executed by the processor 210 and input data or output data on a command related thereto. The memory 235 may include a volatile memory or a nonvolatile memory.

According to an embodiment, the memory 235 may store information related to the tethering connection between the electronic device 200 and the external electronic device 202 and information related to the establishment of the tethering connection. In an embodiment, the information related to the establishment of the tethering connection may include a parameter indicating whether the tethering connection operates in the bridge mode or in the tethering mode.

According to an embodiment, the battery 245 may supply power to at least one element of the electronic device 200 which can be configured to be carried.

According to an embodiment, the interface module 240 may support one or more predetermined protocols which can be used to directly (i.e. wired) or wirelessly connect the electronic device 201 to at least one external electronic device (for example, the external electronic device 202). According to an embodiment, the interface module 240 may include, for example, an Ethernet interface, a Wi-Fi interface, a Bluetooth interface, and/or a Universal Series Bus (USB) interface.

According to an embodiment, the processor 210 may execute, for example, software to control at least one other element (for example, hardware or software components) of the electronic device 200 connected to the processor 210 and may perform various data processing or calculations. According to an embodiment, as at least the part of data processing or calculations, the processor 210 may load command or data received from another element (for example, the input module 220 or the wireless communication module 215) to the memory 235, process commands or data stored in the memory 235, and store resultant data in the memory 235. The processor may 210 include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means plus function, unless the element is expressly recited using the phrase "means for." In addition, an artisan understands and appreciates that a "processor" or "microprocessor" may be hardware in the claimed disclosure.

In an embodiment, the processor 210 may be connected to an access node (for example, a base station, a node B, or an AP) of a public network through the wireless communication module 215 and access the Internet through the public network. In an embodiment, the processor 210 may establish the tethering connection 204 with the external electronic device 202, that is, connected with the electronic device 200 through a wired cable (for example, an Ethernet cable, a USB, or a USB Ethernet) or a wireless connection (for example, Wi-Fi or Bluetooth) via the interface module 240, and map the Internet connection through the wireless communication module 215 to the tethering connection 204 via the interface module 240. In this mapping, the processor 210 may provide the Internet connection to the external electronic device 202. The processor 210 may transfer a data packet received from the external electronic device 202 through the interface module 240 to the Internet (for example, a server in the Internet) through the wireless communication module 215. The processor 210 may transfer the data packet received from the Internet (for example, the server in the Internet) through the wireless communication module 215 to the external electronic device 202 through the interface module 240. When transmitting the data packets, the processor 210 may activate or deactivate a Network Address Translation (NAT) function according to the operation mode of the tethering connection with the external electronic device 202 or the IP address allocation scheme for the external electronic device 202. The NAT function may include the operation of changing an IP address included in an IP header of each packet while the electronic device 200 routes the packets.

The electronic device 200 according to an embodiment may include the interface module 240, and at least one processor 210 connected to the interface module 240, wherein the at least one processor is configured to establish a first Ethernet tethering connection with the external electronic device 202 through the interface module by using an Ethernet driver executed by the at least one processor, provide an Internet service to the external electronic device through the first Ethernet tethering connection, using a first IP address allocated to the external electronic device via the establishment of the first Ethernet tethering connection, identify a change in an IP address of the electronic device while the Internet service is provided, identify whether the first Ethernet tethering connection is in a bridge mode when the change in the IP address of the electronic device is identified, deactivate the Ethernet driver in response to identifying that the IP address of the electronic device is changed while the Internet service is provided and the first Ethernet tethering connection is in the bridge mode, reactivate the deactivated Ethernet driver after deactivating the Ethernet driver, establish a second Ethernet tethering connection with the external electronic device through the reactivated Ethernet driver, and provide the Internet service to the external electronic device through the second Ethernet tethering connection, using a second IP address allocated to the external electronic device via the establishment of the second Ethernet tethering connection.

In an embodiment, the at least one processor may be further configured to execute a network framework 510 configured to handle the first Ethernet tethering connection, and the Ethernet driver, and the at least one processor may be further configured to, when it is identified that the first Ethernet tethering connection is in the bridge mode, control the network framework to deactivate the Ethernet driver.

In an embodiment, when it is identified that the first Ethernet tethering connection is in the bridge mode, the at least one processor may be configured to control the network framework to transfer a deactivation command to the Ethernet driver to deactivate the Ethernet driver.

In an embodiment, the at least one processor may be further configured to execute a network framework configured to hand the first Ethernet tethering connection and the Ethernet driver, and the at least one processor may be further configured to control the network framework to activate the Ethernet driver after deactivating the Ethernet driver.

In an embodiment, the at least one processor may be configured to control the network framework to transfer an activation command to the Ethernet driver to activate the Ethernet driver after deactivating the Ethernet driver.

In an embodiment, the interface module may be configured to be connected to an Ethernet adaptor 500 via a USB connector 545, and the Ethernet adaptor 500 may be configured for conversion between Universal Serial Bus (USB) and Ethernet and may be connected to an Ethernet connector 570 of the external electronic device.

In an embodiment, is response to identifying that the first Ethernet tethering connection is in the bridge mode, the at least one processor may be further configured to deactivate a Network Address Translation (NAT) function in the second Ethernet tethering connection in the bridge mode, and the second IP address may be same as the changed IP address of the electronic device.

The electronic device 200 according to an embodiment includes the interface module 240, and at least one processor 210 connected to the interface module, wherein the at least one processor is configured to establish a first Ethernet tethering connection with an external electronic device through the interface module by using an Ethernet driver executed by the at least one processor, provide an Internet service to the external electronic device through the first Ethernet tethering connection, using a first IP address allocated to the external electronic device via the establishment of the first Ethernet tethering connection, deactivate the Ethernet driver when it is identified that a bridge mode for the external electronic device is configured via a user input while the Internet service is provided, reactivate the deactivated Ethernet driver after deactivating the Ethernet driver, establish a second Ethernet tethering connection in the bridge mode with the external electronic device by using the reactivated Ethernet driver, and provide the Internet service to the external electronic device through the second Ethernet tethering connection, using a second IP address allocated to the external electronic device via the establishment of the second Ethernet tethering connection.

In an embodiment, the at least one processor may be further configured to execute a network framework 510 configured to handle the first Ethernet tethering connection and the Ethernet driver, and the at least one processor may be further configured to, when it is identified that the bridge mode for the external electronic device is configured through the user input while the Internet service is provided through the first Ethernet tethering connection, control the network framework to deactivate the Ethernet driver.

In an embodiment, when it is identified that the bridge mode for the external electronic device is configured through the user input while the Internet service is provided through the first Ethernet tethering connection, the at least one processor may be configured to control the network framework to transfer a deactivation command to the Ethernet driver to deactivate the Ethernet driver.

In an embodiment, the at least one processor may be further configured to execute a network framework configured to hand the first Ethernet tethering connection and the Ethernet driver, and the at least one processor may be further configured to control the network framework to activate the Ethernet driver after deactivating the Ethernet driver.

In an embodiment, the at least one processor may be configured to control the network framework to transfer an activation command to the Ethernet driver to activate the Ethernet driver after deactivating the Ethernet driver.

In an embodiment, the interface module may be configured to be connected to an Ethernet adaptor 500 via a USB connector 545, and the Ethernet adaptor 500 may be configured for conversion between Universal Serial Bus (USB) and Ethernet and may be connected to an Ethernet connector 570 of the external electronic device.

In an embodiment, when it is identified that the first Ethernet tethering connection is in the bridge mode, the at least one processor may be further configured to deactivate a Network Address Translation (NAT) function in the second Ethernet tethering connection in the bridge mode, and the second IP address may be same as the IP address of the electronic device.

The electronic device 200 according to an embodiment may include the input module 220, the output module 230, the interface module 240, and at least one processor 210 connected to the input module, the output module, and the interface module, wherein the at least one processor may be configured to display, through the output module, a network setting screen 1005 including a bridge mode activation menu 1010a related to at least one Ethernet tethering connection provided through the interface module, display, through the output module, a selection menu 1015 including a list of at least one external electronic device connected through the interface module in response to detection of a first user input on the bridge mode activation menu 1010a through the input module, store a parameter for activating a bridge mode for the Ethernet tethering connection with a first external electronic device in response to detection of a second user input of selecting a device name of the first external electronic device on the selection menu 1015 through the input module, and establish the Ethernet tethering connection with the first external electronic device provided through the interface module in the bridge mode.

In an embodiment, the at least one processor may be further configured to switch the Ethernet tethering connection with the first external electronic device to the bridge mode in response to the parameter for activating the bridge mode.

Figure 3:
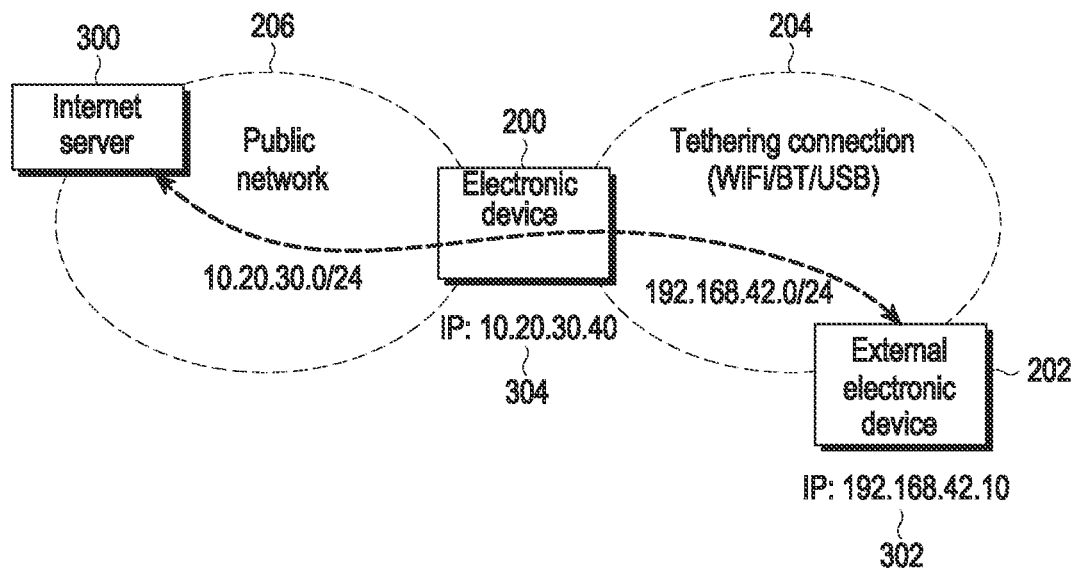
FIG. 3 illustrates a tethering connection in tethering mode according to an embodiment.

FIG. 3 illustrates the tethering connection 204 of tethering mode according to an embodiment.

Referring to FIG. 3, the electronic device 200 may establish Internet connection with a public network 206 and communicate with an Internet server 300 in the Internet through the public network 206. In an embodiment, the public network 206 may be a cellular network (for example, 2G, 3G, LTE, 5G, or NR) or a Wi-Fi network. The electronic device 200 may provide Internet service to the external electronic device 202 by establishing the tethering connection 204 with the external electronic device 202 through USB Ethernet in tethering mode. The tethering connection may operate on the basis of a wired cable (for example, an Ethernet cable, a USB, or USB Ethernet) or wireless connection (for example, Wi-Fi or Bluetooth). In an embodiment, a range of IP address which can be used in the public network 206 may be 10.20.30.0/24, and the electronic device 200 may receive allocation of an IP address 304, for example, 10.20.30.40, uniquely allocated within the range from an Internet server (for example, a Dynamic Host Configuration Protocol (DHCP) server). In an embodiment, the range of IP address which can be used for the Tethering connection 204 may be 192.168.42.0/24, and the electronic device 200 may transfer an IP address, for example, 192.168.42.10 uniquely allocated within the range to the external electronic device 202 in tethering mode.

In an embodiment, the electronic device 200 may use a NAT function in the tethering mode. While the electronic device 200 operates in tethering mode, the processor 210 may convert the source IP address 302 (for example, 192.168.42.10) of the data packet received from the external electronic device 202 through the interface module 240 into the IP address 304 (for example, 10.20.30.40) of the electronic device 200 and then transfer the data packet including the converted IP address 304 (for example, 10.20.30.40) to the Internet server in the public network 206 through the wireless communication module 215. Similarly, while the electronic device 200 operates in tethering mode, the processor 210 may convert the destination IP address 304 (for example, 10.20.30.40) of the data packet received from the Internet server in the public network 206 through the wireless communication module 215 into the IP address 302 (for example, 192.168.42.10) of the external electronic device 202 and then transfer the data packet including the converted IP address 302 (for example, 192.168.42.10) to the external electronic device 202 through the interface module 240.

In an embodiment, the term "tethering mode" may inclusively refer to an operation mode in which the NAT function is activated when the electronic device 200 provides the tethering connection to the external electronic device 202 and may be expressed in other terms, such as router mode or non-bridge mode.

Figure 4:
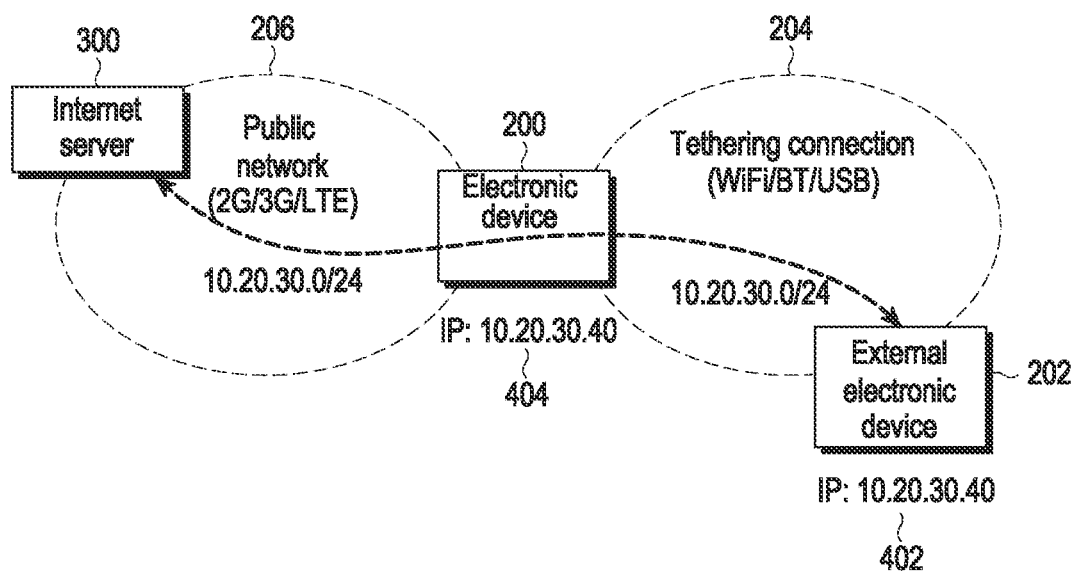
FIG. 4 illustrates the tethering connection in bridge mode according to an embodiment.

FIG. 4 illustrates the tethering connection 204 in bridge mode according to an embodiment.

Referring to FIG. 4, the electronic device 200 may establish Internet connection with the public network 206 and communicate with the Internet server 300 in the Internet through the public network 206. In an embodiment, the public network 206 may be a cellular network (for example, 2G, 3G, LTE, 5G, or NR) or a Wi-Fi network. The electronic device 200 may provide the Internet service to the external electronic device 202 by establishing the tethering connection 204 with the electronic device 200 in bridge mode. The tethering connection may operate on the basis of a wired cable (for example, an Ethernet cable, a USB, or USB Ethernet) or wireless connection (for example, Wi-Fi or Bluetooth). In an embodiment, the range of IP addresses which can be used in the public network 206 may be 10.20.30.0/24, and the electronic device 200 may receive allocation of an IP address 404, for example, 10.20.30.40, uniquely allocated within the range of the public network 206. In an embodiment, the range of IP addresses which can be used for the tethering connection 204 is 10.20.30.0/24, which is the same as that in the cellular network 206, and the electronic device 200 may transfer an IP address 402, for example, 10.20.30.40, which is the same as its own IP address 404 to the external electronic device 202 in bridge mode.

In an embodiment, the electronic device 200 may deactivate the NAT function in bridge mode. While the electronic device 200 operates in bridge mode, a data packet received from the external electronic device 202 through the interface module 240 may include the IP address 402 of the external electronic device 202, and the processor 210 may transfer the data packet to the Internet server 300 in the public network 206 through the wireless communication module 215 without any change in the IP address. Similarly, while the electronic device 200 operates in bridge mode, a data packet received from the Internet server in the public network 206 through the wireless communication module 215 may include the IP address 404 of the electronic device 200, and the processor 210 may transfer the data packet to the external electronic device 202 through the interface module 240 without any change in the IP address. The bridge mode operating as described above may allow the external electronic device 202 to directly access the Internet service, so as to provide private communication having more enhanced security compared to the tethering mode.

In an embodiment, the term "bridge mode" may inclusively refer to operation modes in which the NAT function is deactivated when the electronic device 200 provides the tethering connection 204 to the external electronic device 202.

Figure 5:
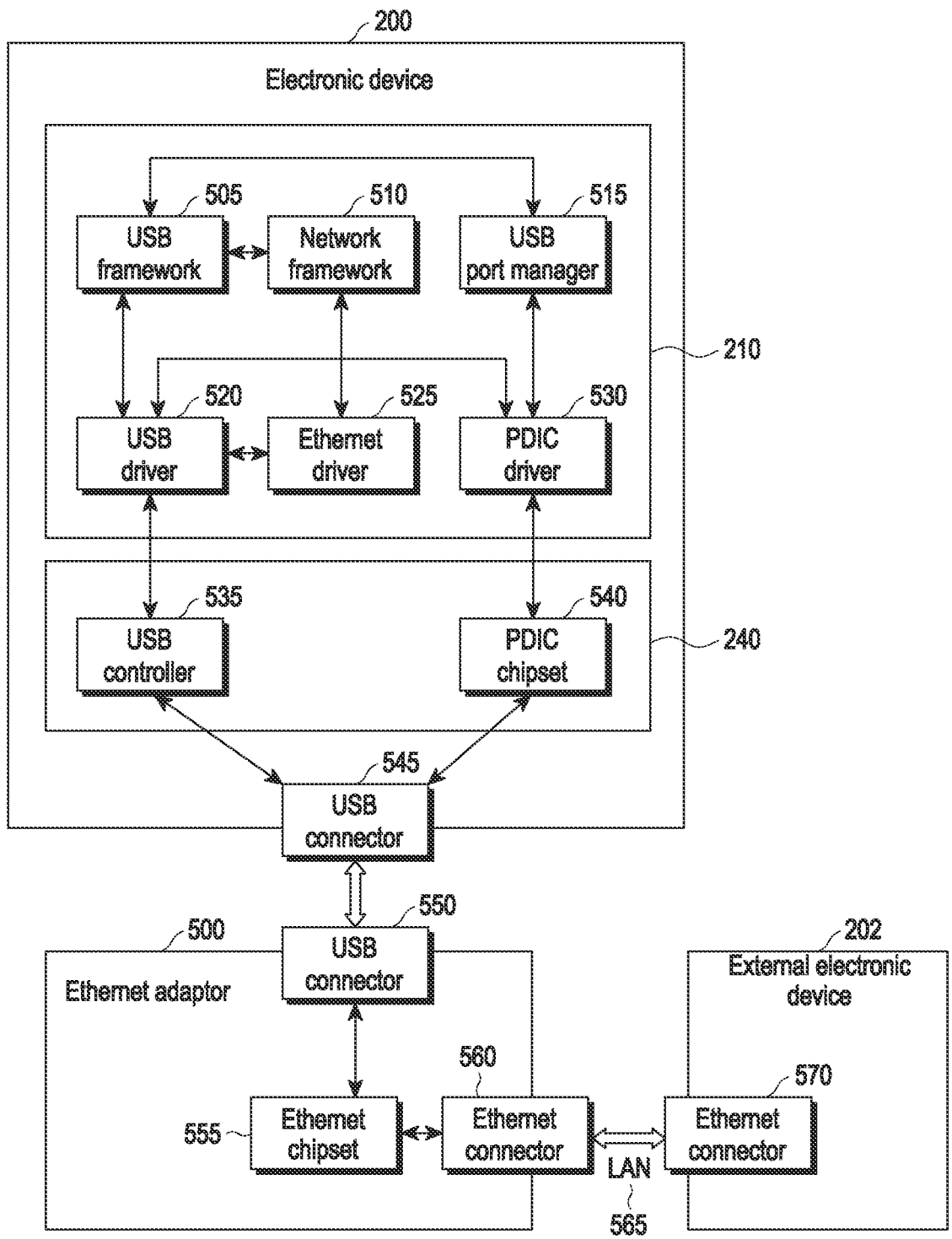
FIG. 5 is a block diagram illustrating a configuration of the electronic device 200 providing the tethering connection according to an embodiment.

FIG. 5 is a block diagram illustrating a configuration of the electronic device 200 providing the tethering connection 204 according to an embodiment. In an embodiment, the electronic device 200 may be implemented as a dongle providing the tethering connection 204 to the external electronic device 202.

Referring to FIG. 5, the processor 210 of the electronic device 200 may include at least one of a USB framework 505, a network framework 510, a USB port manager 515, a USB driver 520, an Ethernet driver 525, or a Power Delivery Integrated Circuit (PDIC) driver 530. The interface module 240 of the electronic device 200 may include at least one of a USB controller 535 and a PDIC chipset 540. The electronic device 200 may further include a USB connector 545 (for example, the connection terminal 178 of FIG. 1) which can be physically connected to an external electronic device (for example, an Ethernet adaptor 500 or the external electronic device 202).

In an embodiment, the USB framework 505, the network framework 510, and the USB port manager 515 may be software frameworks executed by the processor 210, and each one thereof may include at least one program, code, and/or Application Programming Interfaces (APIs).

In an embodiment, the USB driver 520, the Ethernet driver 525, and the PDIC driver 530 may be software kernels executed by the processor 210 and may handle interactions between hardware components (for example, the USB controller 535 or the PDIC chipset 540) and software components (for example, the USB framework 505, the network framework 510, and the USB port manager 515). The USB driver 520 may control power delivery through the PDIC driver 530, handle interactions between the USB controller 535 corresponding to USB hardware and the USB framework 505, and transfer the USB connection to the Ethernet driver 525.

In an embodiment, the USB controller 535 may communicate with the USB framework 505 and the Ethernet driver 525 through the USB driver 520. The network framework 510 may establish the connection with the external electronic device 202 through the USB framework 505 and the Ethernet driver 525 and perform communication through the connection. In an embodiment, when the electronic device 200 is connected to the external electronic device 202 through the Ethernet adaptor 500 serving to perform conversion between USB Ethernets, the Ethernet driver 525 may be a software program executed by the processor 210 in order to provide a software-hardware interaction between the network framework 510 executed in an Operating System (OS) of the electronic device 200 and an Ethernet connector 560 included in the Ethernet adaptor 500. The Ethernet driver 525 may access the USB controller 535 through the USB driver 520 and may control an Ethernet chipset 555 within the Ethernet adaptor 500 through the USB controller 535 in order to allow network access by the external electronic device 202 supporting the Ethernet connection. The network framework 510 may establish and maintain the tethering connection on Ethernet (hereinafter, referred to as the "Ethernet tethering connection") between the electronic device 200 and the external electronic device 202 and communicate with the Ethernet driver 525 through the API.

In an embodiment, the electronic device 200 may be connected to the external electronic device 202, whose user desires to receive tethering service through the USB connector 545. In an embodiment, the electronic device 200 may be connected to the external electronic device 202 through the Ethernet adaptor 500, which in turn is connected to the USB connector 545.

In an embodiment, the Ethernet adaptor 500 may include a USB connector 550 which can physically contact the USB connector 545 of the electronic device 200 and an Ethernet connector 560 (for example, RJ45 connector). The Ethernet connector 560 may be connected to an Ethernet connector 570 (for example, RJ45 connector) of the external electronic device 202 through an Ethernet cable 565. The Ethernet chipset 555 included in the Ethernet adaptor 500 may handle adaption between the USB connector 550 and the Ethernet connector 560.

In an embodiment, when the electronic device 200 operates in tethering mode, the public network 206 between the electronic device 200 and the Internet server 300 and the tethering connection 204 between the electronic device 200 and the external electronic device 202 may be separately (independently) configured. When the IP address of the electronic device 200 is changed in tethering mode, communication failure through the tethering connection 204 between the electronic device 200 and the external electronic device 202 may not occur and the electronic device 200 may not need to reconfigure the tethering connection 204.

Figure 6:
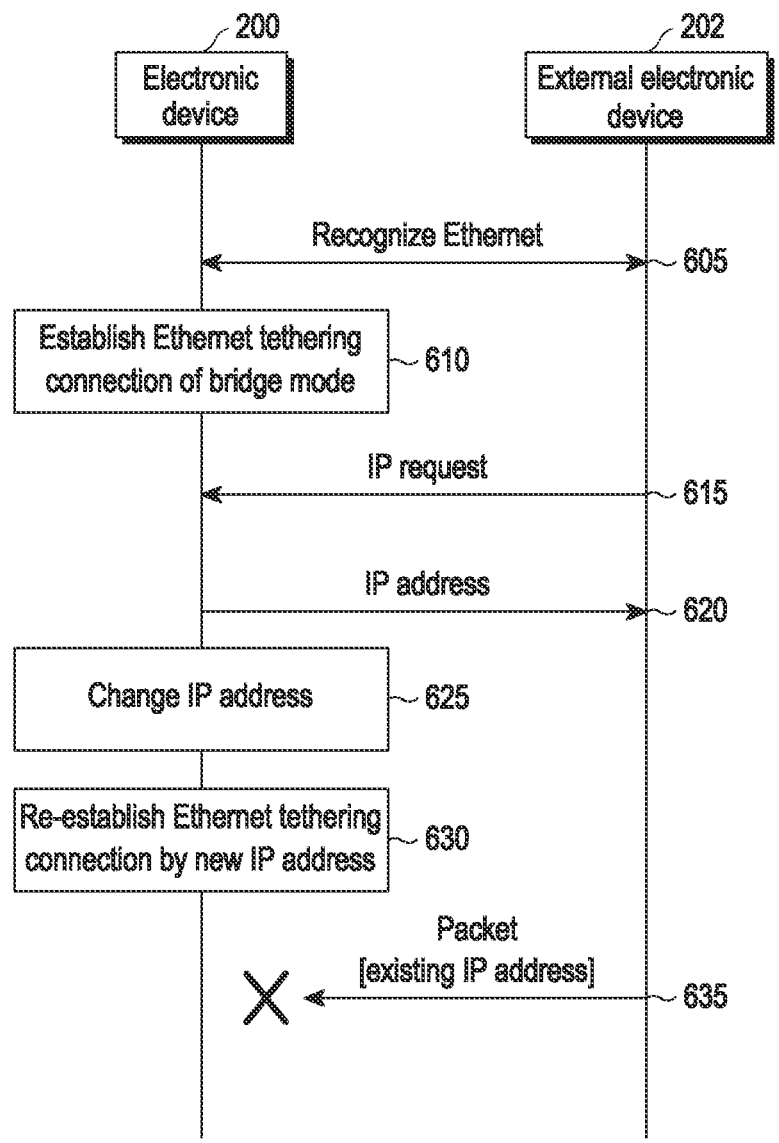
FIG. 6 is a signal flowchart illustrating communication failure between the electronic device and the external electronic device in bridge mode according to an embodiment.

FIG. 6 is a signal flowchart illustrating communication failure between the electronic device 200 and the external electronic device 202 in bridge mode according to an embodiment.

Referring to FIG. 6, in operation 605, the electronic device 200 may recognize the physical connection with the external electronic device 202 through an Ethernet cable (for example, the Ethernet cable 565). In an embodiment, the electronic device 202 may be connected to the USB connector 550 of the Ethernet adaptor 500 through the USB connector 545, and the Ethernet connector 560 of the Ethernet adaptor 500 may be connected to the Ethernet connector 570 of the external electronic device 202 through the cable 565 (for example, a cable supporting a Local Area Network (LAN), and hereinafter referred to as a LAN cable).

In operation 610, the electronic device 200 may configure the Ethernet tethering connection with the external electronic device 202, which is a client device desiring tethering service. In an embodiment, the Ethernet tethering connection may be configured in bridge mode according to internal settings, for example, settings by a user input. In an embodiment, the network framework 510 of the electronic device 200 may recognize (enumerate) the connection with the external electronic device 202 through the Ethernet driver 525 and establish the Ethernet tethering connection with the external electronic device 202. In an embodiment, the establishment of the Ethernet tethering connection may include allocation of an IP address for the external electronic device 202. In the bridge mode, the electronic device 200 may allocate the same IP address (for example, the IP address 402) as the IP address (for example, the IP address 404) of the electronic device 200 to the external electronic device 202.

In operation 615, the external electronic device 202 may make a request for the IP address to be used for Internet service through the Ethernet tethering connection to the electronic device 200. In operation 620, the electronic device 200 may transfer the allocated IP address to the external electronic device 202 in response to the request. Although not illustrated in FIG. 6, the external electronic device 202 may receive Internet service through the electronic device 200 using the allocated IP address.

In operation 625, the electronic device 200 may change its own IP address (for example, the IP address 404). In an embodiment, when switching between a cellular network and a Wi-Fi network, the electronic device 200 may change the IP address. In another embodiment, when switching between a first network and a second network having different IP address ranges, the electronic device 200 may change the IP address. In operation 630, the electronic device 200 may re-establish the Ethernet tethering connection with the external electronic device 202 in order to allow the external electronic device 202 to use the new IP address after the change in the IP address. By the re-establishment, the external electronic device 202 may receive allocation of the new IP address from the electronic device 200.

In operation 635, the external electronic device 202 may not know the change in IP address and the allocation of the new IP address performed by the electronic device 200.

When the external electronic device 202 attempts to use Internet service continuously using the previous IP address, Internet access using the previous IP address may fail. For example, when a data packet including the previous IP address is received from the external electronic device 202, the electronic device 200 may discard the data packet without transmitting the same through the public network 206. Similarly, when a data packet including the previous IP address of the external electronic device 202 is received from the public network 206, the electronic device 200 may discard the data packet without transmitting the same to the external electronic device 202.

To update the external electronic device 202 with the new IP address, the Ethernet cable 565 connecting the Ethernet adaptor 500 and the external electronic device 202 may need to be disconnected and reconnected. This may inconvenience the user and generate an unnecessary communication disconnection. In the following embodiments, the IP address of the external electronic device may be updated without any physical reconnection between the electronic device 200 and the external electronic device 202 and failure in communication with the external electronic device 202 may be prevented when the electronic device 202 operates in bridge mode.

Figure 7:
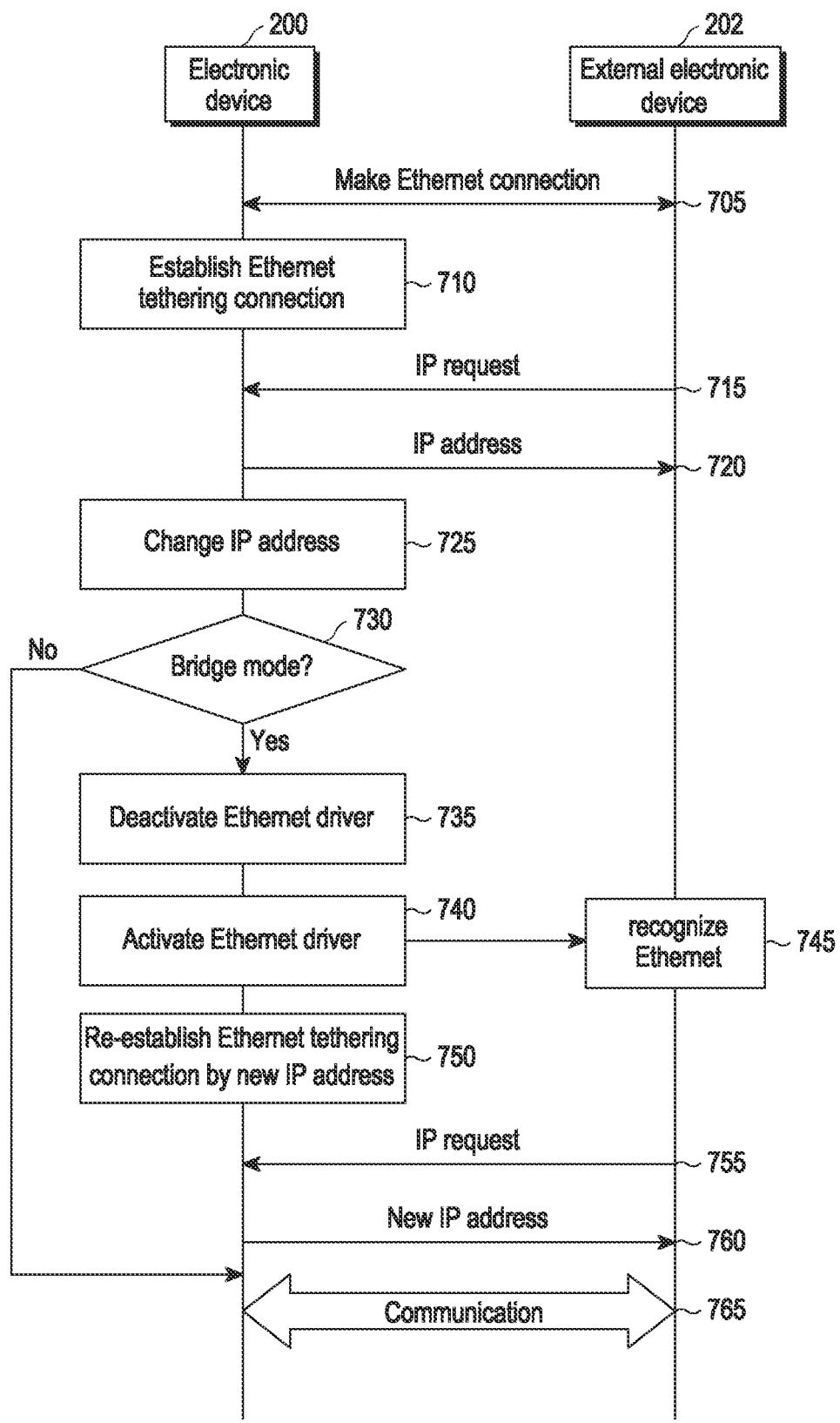
FIG. 7 is a signal flowchart illustrating communication between the electronic device and the external electronic device according to a change in IP address in an embodiment.

FIG. 7 is a signal flowchart illustrating communication between the electronic device 200 and the external electronic device 202 according to a change in IP address in an embodiment.

Referring to FIG. 7, in operation 705, the electronic device 200 may recognize a connection with the external electronic device 202 via, for example, the Ethernet cable 565. In an embodiment, the electronic device 202 may be connected to the USB connector 550 of the Ethernet adaptor 500 through the USB connector 545, and the Ethernet connector 560 of the Ethernet adaptor 500 may be connected to the Ethernet connector 570 of the external electronic device 202 through the Ethernet cable 565.

In operation 710, the electronic device 200 may establish a first Ethernet tethering connection with the external electronic device 202. The establishment of the first Ethernet tethering connection may include allocation of the IP address (for example, a first IP address) of the external electronic device 202. In operation 715, the external electronic device 202 may make a request to the electronic device 200 for the IP address to be used for Internet service. In operation 720, the electronic device 200 may transfer the first IP address allocated to the external electronic device 202 via the establishment of the first Ethernet tethering connection to the external electronic device 202. The first IP address for the external electronic device 202 may be the same as (for example, in the case of the bridge mode) or different from (for example, in the case of the tethering mode) the IP address of the electronic device 200 used when the electronic device 200 accesses the Internet server 300 through the public network 206.

In operation 725, the electronic device 200 may identify the change in its own IP address. For example, the electronic device 200 may change its own IP address from 10.20.30.40 to 10.20.30.50. In an embodiment, when switching between a cellular network and a Wi-Fi network, the electronic device 200 may change the IP address. For example, when the electronic device 200 communicates with the Internet server through the cellular network using the IP address 10.20.30.40 and moves from the cellular network to the Wi-Fi network, may communicate with the Internet server through the Wi-Fi network using the IP address 10.20.30.50. In another embodiment, when switching between a first network and a second network having different IP address ranges, the electronic device 200 may change the IP address. The electronic device 200 may change the IP address for various reasons and a detailed procedure thereof is not limited in the disclosure.

In operation 730, the electronic device 200 may determine whether the bridge mode is configured for a first Ethernet tethering connection with the external electronic device 202. If the first Ethernet tethering connection is not configured in bridge mode and is configured in, for example, tethering mode, the electronic device 200 may proceed to operation 765 in which case the first Ethernet tethering connection may be maintained. On the other hand, if the first Ethernet tethering connection is configured in bridge mode, the electronic device 200 may deactivate the Ethernet driver 525 related to the first Ethernet tethering connection in operation 735. In an embodiment, by deactivation of the Ethernet driver 525, the network framework 510 of the electronic device 200 may terminate the first Ethernet tethering connection or may temporarily stop the same. In an embodiment, by deactivation of the Ethernet driver 525, the external electronic device 202 may recognize that the first Ethernet tethering connection with the electronic device 200 is disconnected.

In operation 740, the electronic device 200 may activate again the Ethernet driver 525. In operation 745, the external electronic device 202 may recognize the connection with the electronic device 200 through the Ethernet according to activation of the Ethernet driver 525.

In operation 750, the electronic device 200 may establish a second Ethernet tethering connection with the external electronic device 202 according to the activation of the Ethernet driver 525. According to the establishment of the second Ethernet tethering connection, a new IP address (for example, a second IP address) for the external electronic device 202 may be allocated. Since the electronic device 200 is configured to operate in bridge mode, the second IP address for the external electronic device 202 may be the same as the new IP address (for example, 10.20.30.50) of the electronic device 200 that was changed in operation 725.

In operation 755, the external electronic device 202 may transmit an IP address request to the electronic device 200 to use Internet service through the electronic device 200. In operation 760, the electronic device 200 may transfer the second IP address allocated for the external electronic device 202 to the external electronic device 202 in response to the IP address request from the external electronic device 202. In operation 765, the electronic device 200 may provide Internet service through the second Ethernet tethering connection to the external electronic device 202 using the second IP address of the external electronic device 202.

Figure 8:
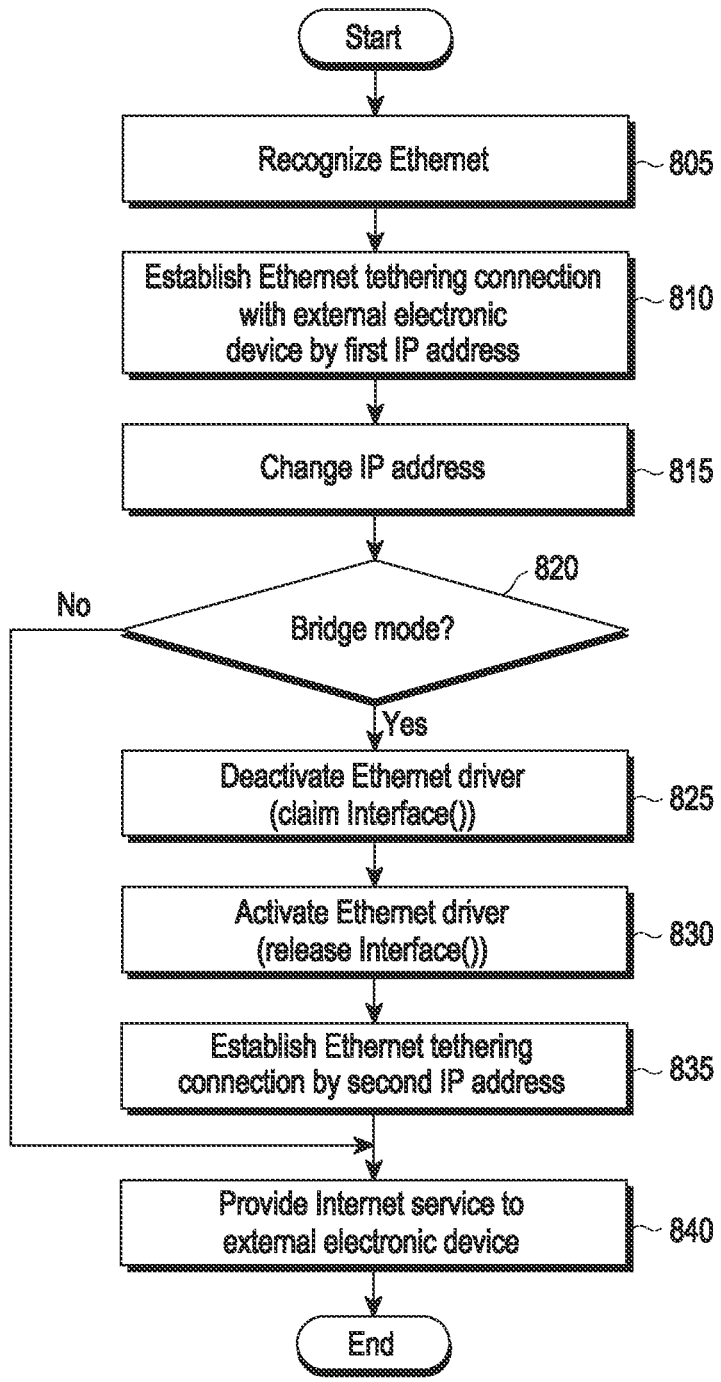
FIG. 8 is a flowchart illustrating the operation of the electronic device according to the change in the IP address in an embodiment.

FIG. 8 is a flowchart illustrating the operation of the electronic device 200 according to the change in the IP address in an embodiment. In an embodiment, the following operations may be executed by the processor 210 of the electronic device 200.

Referring to FIG. 8, in operation 805, via the interface module 240, the processor 210 may recognize that the electronic device 200 is connected to the external electronic device 202 through Ethernet. In an embodiment, the processor 210 (for example, the Ethernet driver 525) may recognize that the Ethernet connector 570 of the external electronic device 202 is connected to the Ethernet connector 560 of the Ethernet adaptor 500 through the Ethernet cable 565. In operation 810, the processor 210 may establish the first Ethernet tethering connection with the external electronic device 202 and provide Internet service to the external electronic device 202 through the first Ethernet tethering connection. In an embodiment, the processor 210 may establish the first Ethernet tethering connection by executing at least one of the network framework 510 and the Ethernet driver 525. In an embodiment, the establishment of the first Ethernet tethering connection may include allocation of an IP address (for example, the first IP address) for the external electronic device 202.

In operation 815, the processor 210 may identify that the IP address of the electronic device 200 is changed to a new IP address. In an embodiment, the processor 210 may identify that the electronic device 200 has moved from a first public network (for example, a cellular network or a Wi-Fi network) to a second public network (for example, a cellular network or a Wi-Fi network) and has received allocation of the new IP address to be used in the second public network through the wireless communication module 215.

In operation 820, the processor 210 may determine whether the first Ethernet tethering connection for the external electronic device 202 is configured as the bridge mode in response to the change in the IP address of the electronic device 200. If the first Ethernet tethering connection is not configured as the bridge mode, the processor 210 may proceed to operation 840. On the other hand, if the first Ethernet tethering connection is configured as the bridge mode, the processor 210 may proceed to operation 825.

While in the first Ethernet tethering connection in bridge mode, the processor 210 may deactivate the Ethernet driver 525 related to the first Ethernet tethering connection in response to the change in the IP address in operation 825. In an embodiment, the processor 210 (executing, for example, the network framework 510) may input a deactivation command (for example, claimInterface( ) of the API) into the Ethernet driver 525. Here, claimInterface( ) of the API may be an API command for disconnecting the connection between the network framework 510 and the Ethernet driver 525. The Ethernet driver 525 may be deactivated by the deactivation command, and the processor 210 (executing, for example, the network framework 510) may consider the Ethernet connection with the external electronic device 202 to be disconnected. Accordingly, the external electronic device 202 may also consider the Ethernet connection with the electronic device 200 to be disconnected.

After the Ethernet driver 525 is deactivated in response to the change in the IP address while in the first Ethernet tethering connection in bridge mode, the processor 210 may activate the Ethernet driver 525 in operation 830. In an embodiment, the processor 210 (executing, for example, the network framework 510) may input an activation command (for example, releaseInterface( ) of the API) to the Ethernet driver 525. Here, releaseInterface( ) of the API may be an API command for reconstructing the connection between the network framework 510 and the Ethernet driver 525. The Ethernet driver 525 may be activated by the activation command, and the network framework 510 may recognize the Ethernet connection with the external electronic device 202 through the Ethernet. Similarly, the external electronic device 202 may recognize the Ethernet connection with the electronic device 200.

In operation 835, the processor 210 may establish a second Ethernet tethering connection with the external electronic device 202. In an embodiment, the processor 210 may control the network framework 510 to establish the second Ethernet tethering connection. The establishment of the second Ethernet tethering connection may include allocation of an IP address (for example, the second IP address) to the external electronic device 202. In an embodiment, the second IP address in the bridge mode may be the same as the new IP address (that is, the changed IP address) of the electronic device 200.

In operation 840, the processor 210 may provide the Internet service through the second Ethernet tethering connection to the external electronic device 202 using the second IP address.

Figure 9:
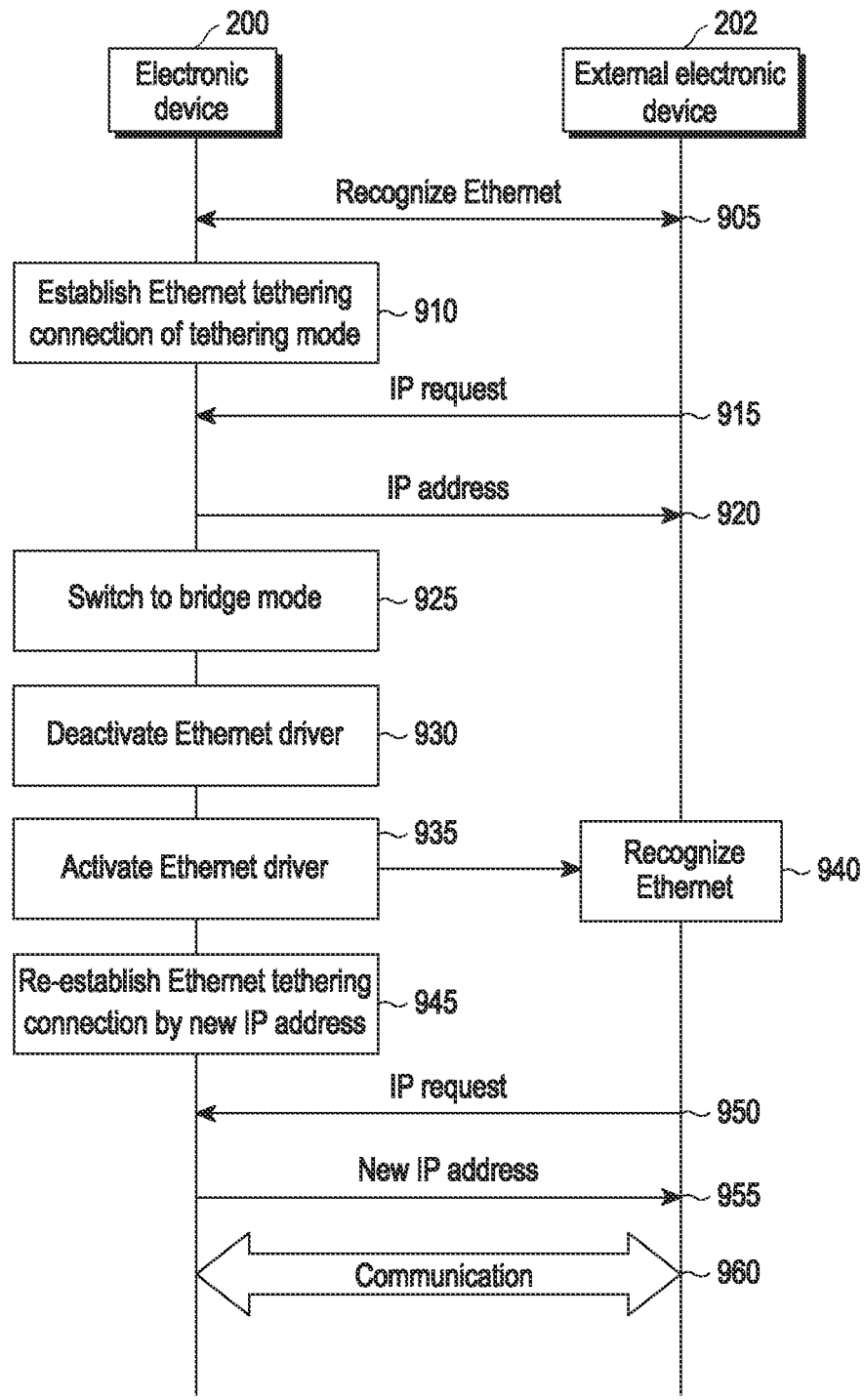
FIG. 9 is a signal flowchart illustrating communication between the electronic device and the external electronic device when switching to bridge mode in an embodiment.

FIG. 9 is a signal flowchart illustrating communication between the electronic device 200 and the external electronic device 202 when switching to bridge mode in an embodiment.

Referring to FIG. 9, in operation 905, the electronic device 200 may recognize a connection with the external electronic device 202 through an Ethernet cable (for example, the Ethernet cable 565). In an embodiment, the electronic device 202 may be connected to the USB connector 550 of the Ethernet adaptor 500 through the USB connector 545, and the Ethernet connector 560 of the Ethernet adaptor 500 may be connected to the Ethernet connector 570 of the external electronic device 202 through the Ethernet cable 565.

In operation 910, the electronic device 200 may establish a first Ethernet tethering connection with the external electronic device 202. In an embodiment, when the bridge mode is not configured in the electronic device 200, the first Ethernet tethering connection may be established in tethering mode. In operation 915, the external electronic device 202 may make a request for the IP address, to be used for Internet service through the electronic device 200, to the electronic device 202. In operation 920, the electronic device 200 may transfer the IP address (for example, the first IP address) allocated to the external electronic device 202 via the establishment of the first Ethernet tethering connection to the external electronic device 202. In the tethering mode, the first IP address for the external electronic device 202 may be different from the IP address (for example, 10.20.30.40) used when the electronic device 200 accesses the Internet server 300 through the public network 206.

In operation 925, the electronic device 200 may identify that the bridge mode is configured by a user input. For example, the electronic device 200 may receive a user input of making a request for switching to bridge mode while Internet service is provided to the external electronic device 202 through the first Ethernet tethering connection and switch to the bridge mode. In operation 930, the electronic device 200 may deactivate the Ethernet driver 525 related to the first Ethernet tethering connection in response to the switching to the bridge mode. In an embodiment, by deactivation of the Ethernet driver 525, the network framework 510 of the electronic device 200 may terminate the first Ethernet tethering connection or may temporarily stop the same. In an embodiment, by deactivation of the Ethernet driver 525, the external electronic device 202 may recognize that the first Ethernet tethering connection with the electronic device 200 is disconnected.

In operation 935, the electronic device 200 may activate again the Ethernet driver 525. In operation 940, the external electronic device 202 may recognize the connection with the electronic device 200 through the Ethernet according to activation of the Ethernet driver 525.

In operation 945, the electronic device 200 may establish a second Ethernet tethering connection with the external electronic device 202 according to activation of the Ethernet driver 525. According to the establishment of the second Ethernet tethering connection, a new IP address (for example, a second IP address) for the external electronic device 202 may be allocated. Since the electronic device 200 has switched to the bridge mode, the second IP address for the external electronic device 202 may be the same as the IP address (for example, 10.20.30.40) of the electronic device 200.

In operation 950, the external electronic device 202 may transfer an IP address request to the electronic device 200 for Internet service through the electronic device 200. In operation 955, the electronic device 200 may transfer the second IP address allocated for the external electronic device 202 to the external electronic device 202 in response to the IP address request from the external electronic device 202. In operation 960, the electronic device 200 may provide Internet service through the second Ethernet tethering connection to the external electronic device 202 using the second IP address of the external electronic device 202.

Figure 10A:
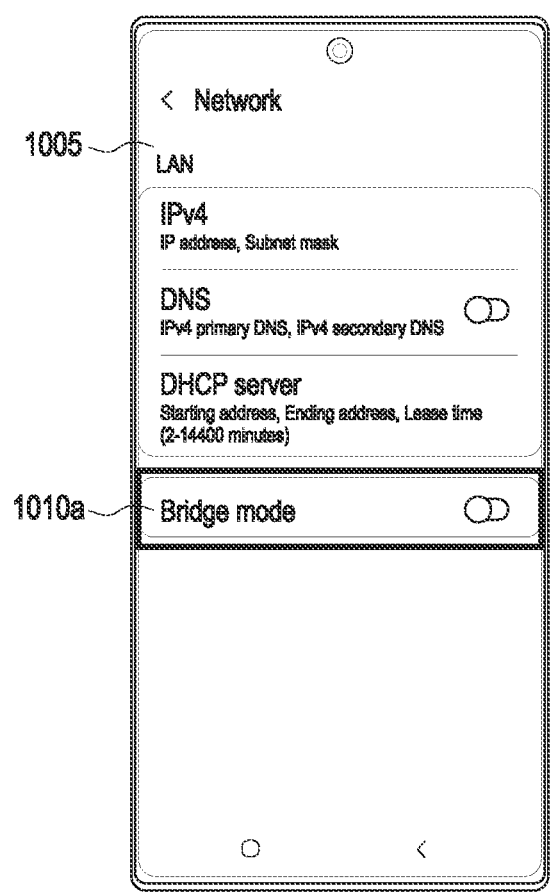
FIGS. 10A, 10B, and 10C illustrate user interfaces (User Experience (UX)) for switching the electronic device to the bridge mode in an embodiment.
Figure 10B:
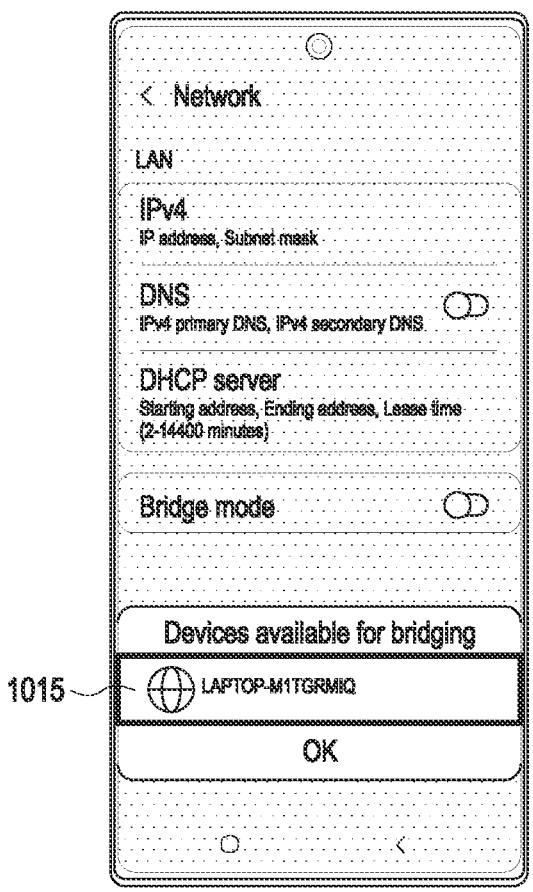
Figure 10C:
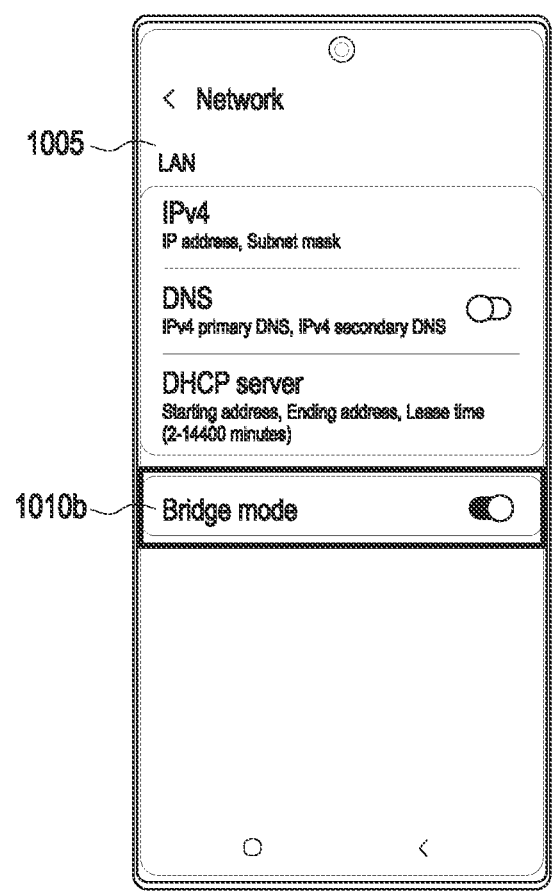

FIGS. 10A, 10B, and 10C illustrate user interfaces (User Experience (UX)) for switching the electronic device 200 to the bridge mode in an embodiment.

Referring to FIG. 10A, the processor 210 may display a bridge mode activation menu 1010a on a network setting screen 1005 for the Ethernet tethering connection through the output module 230 (for example, a display).

Referring to FIG. 10B, the processor 210 may display a selection menu 1015 including a list of external electronic devices connected to the Ethernet connector 560 in response to a user input into the bridge mode activation menu 1010a. For example, the selection menu 1015 may include a device name of the external electronic device 202, for example, LAPTOP-XXXX.

Referring to FIG. 10C, the processor 210 may activate the bridge mode for the Ethernet tethering connection with the external electronic device 202 in response to a user input of selecting the device name of the external electronic device 202 to be in the bridge mode on the selection menu 1015. In an embodiment, the processor 210 may store a parameter indicating the bridge mode in the memory 235 and refer to the parameter when establishing and controlling the Ethernet tethering connection with the external electronic device 202 using the network framework 510.

Figure 11:
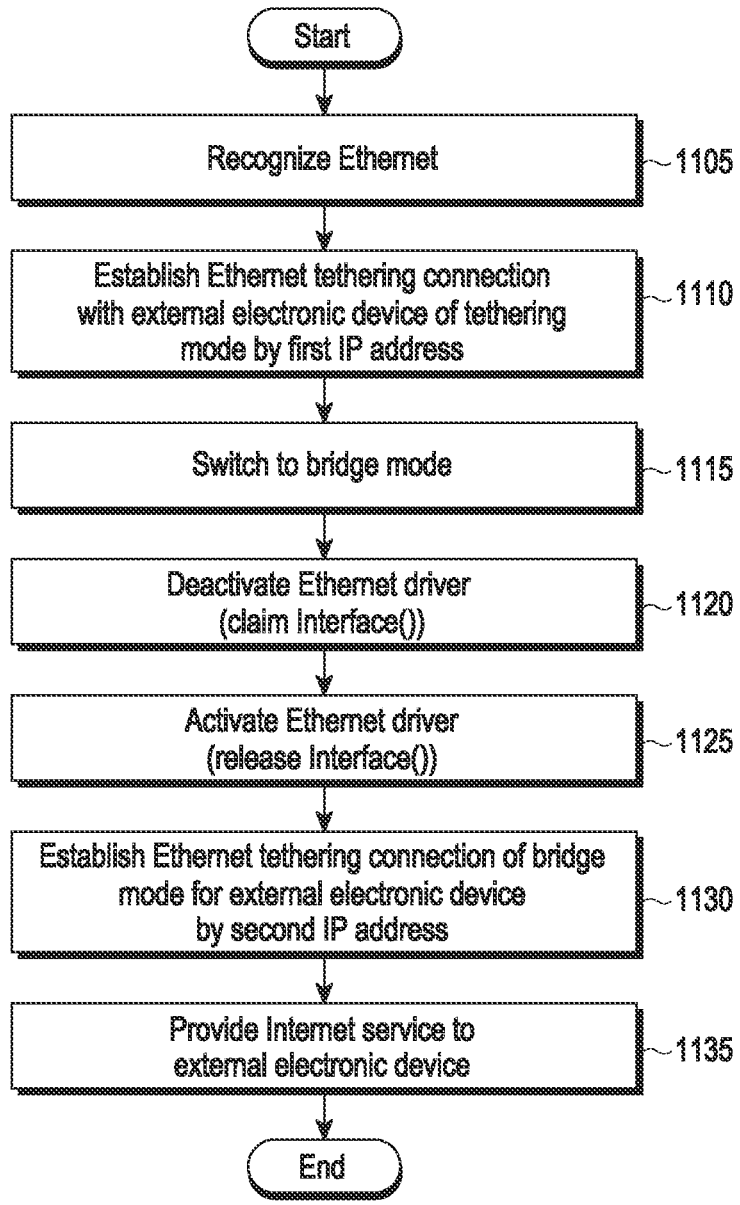
FIG. 11 is a flowchart illustrating the operation of the electronic device when switching to bridge mode in an embodiment.

FIG. 11 is a flowchart illustrating the operation of the electronic device 200 when switching to bridge mode in an embodiment. In an embodiment, the following operations may be executed by the processor 210 of the electronic device 200.

Referring to FIG. 11, in operation 1105, the processor 210 may recognize that the electronic device 200 is connected to the external electronic device 202 through Ethernet. In an embodiment, through the Ethernet driver 525, the processor 210 may recognize that the Ethernet connector 570 of the external electronic device 202 is connected to the Ethernet connector 560 of the Ethernet adaptor 500 through the Ethernet cable 565. In operation 1110, the processor 210 may establish the first Ethernet tethering connection with the external electronic device 202 and provide Internet service to the external electronic device 202 through the Ethernet tethering connection. In an embodiment, the establishment of the first Ethernet tethering connection may include allocation of the IP address (for example, the first IP address) for the external electronic device 202. In an embodiment, the processor 210 may establish the first Ethernet tethering connection in tethering mode according to a default setting or a user setting of the electronic device 200. Accordingly, the first IP address of the external electronic device 202 used in the first Ethernet tethering connection in tethering mode may be different from the IP address (for example, 10.20.30.40) of the electronic device 200.

In operation 1115, the processor 210 may recognize that the first Ethernet tethering connection is to be switched to bridge mode. For example, the processor 210 may receive a user input of configuring bridge mode for the external electronic device 202 through UX of FIGS. 10A, 10B, and 10C and switch the first Ethernet tethering connection to bridge mode. In operation 1120, the processor 210 may deactivate the Ethernet driver 525 related to the first Ethernet tethering connection in response to switching of the first Ethernet tethering connection from tethering mode to bridge mode. In an embodiment, the processor 210 may control the network framework 510 to input a deactivation command (for example, claimInterface( ) of the API) into the Ethernet driver 525. The Ethernet driver 525 may be deactivated by the deactivation command, and the network framework 510 may consider the Ethernet connection with the external electronic device 202 to be disconnected. Accordingly, the external electronic device 202 may also consider the Ethernet connection with the electronic device 200 to be disconnected.

In operation 1125, the processor 210 may activate the Ethernet driver 525. In an embodiment, the processor 210 may control the network framework 510 to input an activation command (for example, releaseInterface( ) of the API) into the Ethernet driver 525. The Ethernet driver 525 may be activated by the activation command, and the network framework 510 may recognize the connection with the external electronic device 202 through the Ethernet. Similarly, the external electronic device 202 may recognize the Ethernet connection with the electronic device 200.

In operation 1130, the processor 210 may establish the second Ethernet tethering connection with the external electronic device 202. In an embodiment, the processor 210 may control the network framework 510 to establish the second Ethernet tethering connection. In an embodiment, the processor 210 may establish the second Ethernet tethering connection in bridge mode on the basis of a parameter indicating the bridge mode which can be configured by, for example, a user input as illustrated in FIGS. 10A, 10B, and 10C. The establishment of the second Ethernet tethering connection may include allocation of the IP address (for example, the second IP address) for the external electronic device 202. According to an embodiment, the second IP address in the bridge mode may be the same as the IP address (for example, 10.20.30.40) of the electronic device 200.

In operation 1135, the processor 210 may provide Internet service through the second Ethernet tethering connection to the external electronic device using the second IP address.

Figure 12:
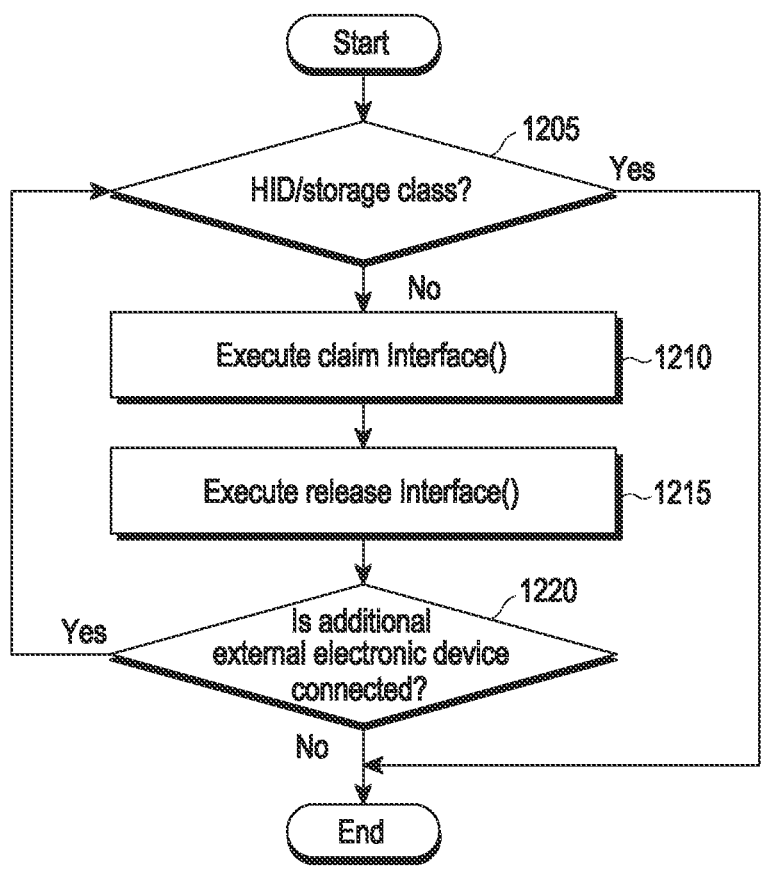
FIG. 12 is a flowchart illustrating the operation of the electronic device according to a USB communication device class in an embodiment.

FIG. 12 is a flowchart illustrating the operation of the electronic device 200 according to a USB communication device class in an embodiment. In an embodiment, the following operations may replace operations 1120 and 1125 of FIG. 11.

Referring to FIG. 12, in operation 1205, the processor 210 may identify a USB class indicating the use of the external electronic device 202 connected to the electronic device 200 through the USB connector 545 and the Ethernet adaptor 500. The USB class may designate the use of the external electronic device 202 and may have, for example, one value in [Table 1] below.

TABLE 1

| Class | Use | Explanation | Example |
|---|---|---|---|
| 00h | Device | Undesignated | Device class is unspecified, interface descriptors are used to determine needed drivers |
| 01h | Interface | Audio | Speaker, microphone, sound card, and media |
| 02h | Both | communications and CDC(communication device class) control | Modem, Ethernet adaptor, Wi-Fi, and adaptor |
| 03h | Interface | HID(human interface device) | Keyboard, mouse, and joystick |
| 05h | Interface | PID(physical interface device) | Force feedback joystick |
| 06h | Interface | image | Webcam and scanner |
| 07h | Interface | printer | Laser printer, inkjet printer, and CNC machine |
| 08h | Interface | MSC(mass storage) or UMS (universal mass storage) | USB flash drive, memory card reader, digital audio player, digital camera, and external drive |
| 09h | Device | USB hub | Entire bandwidth hub |
| 0Ah | Interface | CDC-Data | Used with class 02h: communication and CDC control |
| 0Bh | Interface | smart card | USB smart card reader |
| 0Dh | Interface | content security | Fingerprint reader |
| 0Eh | Interface | video | Webcam |
| 0Fh | Interface | personal healthcare | Pulse monitor (wrist watch) |
| 10h | Interface | audio/video devices | Webcam and TV |
| DCh | Both | diagnostic device | USB compliance test device |
| E0h | Interface | wireless controller | Bluetooth adaptor and Microsoft RNDIS |
| EFh | Both | Miscellaneous | ActiveSync device |
| FEh | Interface | Application-specific | IrDA Bridge, Test & Measurement Class (USBTMC), and USB DFU (Direct Firmware Update) |
| FFh | Both | Vendor-specific | Indicates that a device needs vendor-specific drivers |

The electronic device 200 may include a USB port, an Ethernet port, and a multiport adaptor providing for HDMI output. In the case of the multiport adaptor, when the Ethernet connection is disconnected and then reconstructed regardless of USB CDC, for example, when the external electronic device 202 includes USB storage, failure in file transmission between the external electronic device 202 and the electronic device 200 may occur. Further, for example, when the external electronic device 202 includes an HID such as a keyboard or a mouse, the connection between the external electronic device 202 and the electronic device 200 also needs to be maintained.

In order to prevent the above problem, in operation 1205, the processor 210 may determine whether the USB class of the external electronic device 202 is 03h indicating an HID or 08h indicating mass storage. If the external electronic device 202 is used as HID or mass storage, the processor 210 may terminate the operation of FIG. 12. On the other hand, if the external electronic device 202 is not used as HID or mass storage, the processor 210 may execute the command, for example, claimInterface( ) of the API for deactivating the Ethernet driver 525 related to the external electronic device 202 in operation 1210. Subsequently, in operation 1215, the processor 210 may execute the command, for example, releaseInterface( ) of the API for activating again the Ethernet driver 525.

In an embodiment, the processor 210 may deactivate for a while the Ethernet driver 525 executed on the kernel, which is related to the external electronic device 202 connected to the electronic device 200, using a USB host API. In an embodiment, the USB host API may be an API set allowing a USB host function of the electronic device 200 operating on the Android OS to be directly implemented in an application. At this time, in the API set, claimInterface( ) may serve to disconnect the connection between the network framework 510 and the Ethernet driver 525, and releaseInterface( ) may serve to reconstruct the connection between the network framework 510 and the Ethernet driver 525. The processor 210 may provide the effect of disconnecting and then reconnecting the connection between the Ethernet connector 560 and the Ethernet connector 570 by sequentially executing claimInterface( ) and releaseInterface( ).

In operation 1220, the processor 210 may determine whether an additional external electronic device is connected to the electronic device 200. In an embodiment, when the electronic device 200 includes a multiport adaptor, the processor 210 may perform operations 1205, 1210, and 1215 for a plurality of external electronic devices connected through the multiport adaptor.

Advantages which can be obtained through the above embodiments are described below.

In certain embodiments of the disclosure, the cable connection may be not need to be physically released and the USB connection may be reconstructed only for the external electronic device 202 corresponding to a specific USB port among a plurality of external electronic devices connected to the electronic device 200.

In certain embodiments of the disclosure, without any physical release of the connection of the Ethernet cable for connecting the electronic device 200 and the external electronic device 202 or any physical removal of the external electronic device 202, the user may conveniently switch the Ethernet tethering connection for the external electronic device 202 to bridge mode by acquiring a new IP address and providing the same to the external electronic device 202 only through the operation of controlling the configuration of the electronic device 200.

A method of operating an electronic device 200 for wireless communication according to an embodiment includes an operation 810 of establishing a first Ethernet tethering connection with an external electronic device by using an Ethernet driver 525 executed by a processor 210 of the electronic device, an operation 810 of providing an Internet service to the external electronic device through the first Ethernet tethering connection, using a first IP address allocated to the external electronic device via the establishment of the first Ethernet tethering connection, an operation 815 of identifying a change in an IP address of the electronic device while the Internet service is provided, an operation 820 of identifying whether the first Ethernet tethering connection is in a bridge mode when the change in the first IP address of the electronic device is identified, an operation 825 of deactivating the Ethernet driver in response to identifying that the IP address of the electronic device is changed while the Internet service is provided and the first Ethernet tethering connection is in the bridge mode, an operation 830 of reactivating the deactivated Ethernet driver after deactivating the Ethernet driver, an operation of establishing a second Ethernet tethering connection with the external electronic device by using the reactivated Ethernet driver in operation 835, and providing the Internet service to the external electronic device through the second Ethernet tethering connection, using a second IP address allocated to the external electronic device via the establishment of the second Ethernet tethering connection in operation 840.

In an embodiment, the operation of deactivating the Ethernet driver may include an operation of, when it is identified that the first Ethernet tethering connection is in the bridge mode, inputting a deactivation command into the Ethernet driver from a network framework handling the first Ethernet tethering connection.

In an embodiment, the deactivation command may include the command "claimInterface( )" of an Application Programmable Interface (API) between the network framework and the Ethernet driver.

In an embodiment, the operation of reactivating the deactivated Ethernet driver may include an operation of inputting an activation command into the Ethernet driver from a network framework handling the first Ethernet tethering connection after deactivating the Ethernet driver.

In an embodiment, the deactivation command may include the command "releaseInterface( )" of an Application Programmable Interface (API) between the network framework and the Ethernet driver.

In an embodiment, the method may further include an operation of deactivating a Network Address Translation (NAT) function in the second Ethernet tethering connection in the bridge mode. In an embodiment, the second IP address may be same as the IP address of the electronic device.

A method of operating an electronic device 200 for wireless communication according to an embodiment includes an operation 1110 of establishing a first Ethernet tethering connection for an external electronic device through an Ethernet driver 525 executed by the processor 210 of the electronic device, an operation 1110 of providing an Internet service to the external electronic device, using a first IP address allocated via the establishment of the first Ethernet tethering connection, an operation 1120 of deactivating the Ethernet driver in the case 1115 in which it is identified that a bridge mode for the external electronic device is configured through a user input while the Internet service is provided, an operation 1125 of reactivating the deactivated Ethernet driver after deactivating the Ethernet driver, an operation 1130 of establishing a second Ethernet connection for the external electronic device using the reactivated Ethernet driver, and an operation 1135 of providing the Internet service to the external electronic device, using a second IP address allocated via the establishment of the second Ethernet tethering connection.

In an embodiment, the operation of deactivating the Ethernet driver may include an operation of, when it is identified that the bridge mode for the external electronic device is configured through the user input while the Internet service is provided through the first Ethernet tethering connection, inputting a deactivation command into the Ethernet driver from a network framework handling the first Ethernet tethering connection.

In an embodiment, the deactivation command may include the command "claimInterface( )" of an Application Programmable Interface (API) between the network framework and the Ethernet driver.

In an embodiment, the operation of reactivating the deactivated Ethernet driver may include an operation of inputting an activation command into the Ethernet driver from the network framework handling the first Ethernet tethering connection.

In an embodiment, the activation command may include the command "releaseInterface( )" of an Application Programmable Interface (API) between the network framework and the Ethernet driver.

In an embodiment, the method may further include an operation of, when it is identified that the first Ethernet tethering connection is in the bridge mode, deactivating a Network Address Translation (NAT) function in the second Ethernet tethering connection in the bridge mode, and the second IP address may be same as the IP address of the electronic device.

A method of operating the electronic device 200 for wireless communication according to an embodiment may include an operation of displaying a network setting screen 1005 including a bridge mode activation menu 1010a related to at least one Ethernet tethering connection for at least one external electronic device, an operation of displaying a selection menu 1015 including a list of the at least one external electronic device connected to the electronic device in response to detection of a first user input on the bridge mode activation menu 1010a, an operation of storing a parameter for activating a bridge mode for the Ethernet tethering connection with a first external electronic device in response to detection of a second user input of selecting a device name of the first external electronic device on the selection menu 1015, and an operation of establishing the Ethernet tethering connection with the first external electronic device in the bridge mode.

In an embodiment, the method may further include an operation of switching the Ethernet tethering connection with the first external electronic device to the bridge mode in response to the parameter for activating the bridge mode.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

The invention claimed is:

1. An electronic device comprising:
an interface module; and
at least one processor connected to the interface module, wherein the at least one processor is configured to:
establish a first Ethernet tethering connection with an external electronic device through the interface module by using an Ethernet driver executed by the at least one processor,
provide an Internet service to the external electronic device through the first Ethernet tethering connection, using a first IP address allocated to the external electronic device via the establishment of the first Ethernet tethering connection,
identify a change in an IP address of the electronic device while the Internet service is provided,
identify whether the first Ethernet tethering connection is in a bridge mode when the change in the IP address of the electronic device is identified,
deactivate the Ethernet driver in response to identifying that the IP address of the electronic device is changed while the Internet service is provided and the first Ethernet tethering connection is in the bridge mode,
reactivate the deactivated Ethernet driver after deactivating the Ethernet driver,
establish a second Ethernet tethering connection with the external electronic device by using the reactivated Ethernet driver, and
provide the Internet service to the external electronic device through the second Ethernet tethering connection, using a second IP address allocated to the external electronic device via the establishment of the second Ethernet tethering connection.

2. The electronic device of claim 1, wherein the at least one processor is further configured to execute a network framework configured to handle the first Ethernet tethering connection and the Ethernet driver and the at least one processor is further configured to control the network framework to activate or deactivate the Ethernet driver.

3. The electronic device of claim 2, wherein the at least one processor is further configured to control the network framework to transfer an activation command or a deactivation command to the Ethernet driver to activate or deactivate the Ethernet driver.

4. The electronic device of claim 1, wherein the interface module is configured to be connected to an Ethernet adaptor via a USB connector, and wherein the Ethernet adaptor is configured for conversion between Universal Serial Bus (USB) and Ethernet and is connected to an Ethernet connector of the external electronic device.

5. The electronic device of claim 1, wherein, in response to identifying that the first Ethernet tethering connection is in the bridge mode, the at least one processor is further configured to deactivate a Network Address Translation (NAT) function in the second Ethernet tethering connection in the bridge mode, and the second IP address is same as the changed IP address of the electronic device.

6. An electronic device comprising:
an interface module; and
at least one processor connected to the interface module, wherein the at least one processor is configured to:
establish a first Ethernet tethering connection with an external electronic device through the interface module by using an Ethernet driver executed by the at least one processor,
provide an Internet service to the external electronic device through the first Ethernet tethering connection, using a first IP address allocated to the external electronic device via the establishment of the first Ethernet tethering connection,
deactivate the Ethernet driver when it is identified that a bridge mode for the external electronic device is configured via a user input while the Internet service is provided,
reactivate the deactivated Ethernet driver after deactivating the Ethernet driver,
establish a second Ethernet tethering connection in the bridge mode with the external electronic device by using the reactivated Ethernet driver, and
provide the Internet service to the external electronic device through the second Ethernet tethering connection, using a second IP address allocated to the external electronic device via the establishment of the second Ethernet tethering connection.

7. The electronic device of claim 6, wherein the at least one processor is further configured to execute a network framework configured to handle the first Ethernet tethering connection and the Ethernet driver, and the at least one processor is further configured to control the network framework to activate or deactivate the Ethernet driver.

8. The electronic device of claim 7, wherein the at least one processor is further configured to control the network framework to transfer an activation command or a deactivation command to the Ethernet driver to activate or deactivate the Ethernet driver.

9. The electronic device of claim 6, wherein the interface module is configured to be connected to an Ethernet adaptor via a USB connector, and wherein the Ethernet adaptor is configured for conversion between Universal Serial Bus (USB) and Ethernet and is connected to an Ethernet connector of the external electronic device.

10. The electronic device of claim 8, wherein, when it is identified that the first Ethernet tethering connection is in the bridge mode, the at least one processor is further configured to deactivate a Network Address Translation (NAT) function in the second Ethernet tethering connection in the bridge mode, and the second IP address is same as an IP address of the electronic device.

11. A method of operating an electronic device for wireless communication, the method comprising:
establishing a first Ethernet tethering connection with an external electronic device by using an Ethernet driver executed by a processor of the electronic device;
providing an Internet service to the external electronic device through the first Ethernet tethering connection, using a first IP address allocated to the external electronic device via the establishment of the first Ethernet tethering connection;
identifying a change in an IP address of the electronic device while the Internet service is provided;

identifying whether the first Ethernet tethering connection is in a bridge mode when the change in the IP address of the electronic device is identified;

deactivating the Ethernet driver in response to identifying that the IP address of the electronic device is changed while the Internet service is provided and the first Ethernet tethering connection is in the bridge mode;

reactivating the deactivated Ethernet driver after deactivating the Ethernet driver;

establishing a second Ethernet tethering connection with the external electronic device by using the reactivated Ethernet driver; and providing the Internet service to the external electronic device through the second Ethernet tethering connection, using a second IP address allocated to the external electronic device via the establishment of the second Ethernet tethering connection.

12. The method of claim 11, wherein the deactivating of the Ethernet driver further comprises, when it is identified that the first Ethernet tethering connection is in the bridge mode, inputting a deactivation command into the Ethernet driver from a network framework handling the first Ethernet tethering connection, wherein the deactivation command comprises command "claimInterface( )" of an Application Programmable Interface (API) between the network framework and the Ethernet driver.

13. The method of claim 11, wherein the reactivating of the deactivated Ethernet driver further comprises inputting an activation command into the Ethernet driver from a network framework handling the first Ethernet tethering connection after deactivating the Ethernet driver, wherein the activation command comprises command "releaseInterface( )" of an Application Programmable Interface (API) between the network framework and the Ethernet driver.

14. The method of claim 11, further comprising deactivating a Network Address Translation (NAT) function in the second Ethernet tethering connection in the bridge mode.

15. The method of claim 11, wherein the second IP address is same as the changed IP address of the electronic device.

* * * * *